(12) United States Patent
Chang et al.

(10) Patent No.: US 11,953,940 B2
(45) Date of Patent: Apr. 9, 2024

(54) OPTICAL PLATE AND DISPLAY APPARATUS

(71) Applicant: Darwin Precisions Corporation, Hsinchu County (TW)

(72) Inventors: Yu-Cheng Chang, Hsinchu County (TW); Shu-Ching Peng, Hsinchu County (TW); Yu-Ming Huang, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 301 days.

(21) Appl. No.: 17/064,624

(22) Filed: Oct. 7, 2020

(65) Prior Publication Data
US 2022/0050499 A1   Feb. 17, 2022

(30) Foreign Application Priority Data
Aug. 12, 2020   (TW) .................................. 109127400

(51) Int. Cl.
*G02B 5/02*   (2006.01)
*G06F 1/16*   (2006.01)

(52) U.S. Cl.
CPC ......... *G06F 1/1609* (2013.01); *G02B 5/0215* (2013.01)

(58) Field of Classification Search
CPC ................ G02B 6/0053; G02B 6/0036; G02B 5/0278; G02B 5/0215
See application file for complete search history.

(56) References Cited

U.S. PATENT DOCUMENTS

| | | | | |
|---|---|---|---|---|
| 6,123,431 A | * | 9/2000 | Teragaki .............. | G02B 6/0038 362/333 |
| 6,606,133 B1 | * | 8/2003 | Okabe .................. | G02B 5/0252 349/112 |
| 6,827,456 B2 | * | 12/2004 | Parker .................. | G02B 6/0053 362/330 |

(Continued)

FOREIGN PATENT DOCUMENTS

| | | | | |
|---|---|---|---|---|
| CN | 102597819 A | * | 7/2012 | ........... G02B 5/0231 |
| CN | 104297824 A | * | 1/2015 | ............ B60J 1/2041 |

(Continued)

*Primary Examiner* — Christopher Stanford
(74) *Attorney, Agent, or Firm* — WPAT, P.C.

(57) ABSTRACT

A display apparatus includes a light-transmitting structural plate, some optical microscopic structures, an optical film, a base plate and some light emitting elements. The light-transmitting structural plate has a first side and a second side opposite to each other. The optical microscopic structures are regularly arrayed and formed on the first side or the second side. The optical microscopic structure has an inclined surface connecting at a connecting line and forming an angle ranging between 30 degrees and 150 degrees with a corresponding inclined surface of an adjacent one of the optical microscopic structures. The optical film is located on the first side. The base plate is separated from the second side by a space. The light emitting elements are located inside the space and disposed on the base plate. The light emitting elements respectively emit a light ray to the light-transmitting structural plate.

12 Claims, 12 Drawing Sheets

(56) References Cited

U.S. PATENT DOCUMENTS

| | | | | |
|---|---|---|---|---|
| 7,695,152 B2 * | 4/2010 | Chang | ............... | G02B 5/0231 |
| | | | | 362/330 |
| 7,695,180 B2 * | 4/2010 | Schardt | ............... | G02B 5/0278 |
| | | | | 362/330 |
| 7,753,565 B2 * | 7/2010 | Hsu | ............... | G02B 5/124 |
| | | | | 362/333 |
| 2007/0047258 A1 | 3/2007 | Yao et al. | | |
| 2008/0248256 A1 | 10/2008 | Kim et al. | | |
| 2009/0052036 A1 * | 2/2009 | Chang | ............... | G02B 5/0278 |
| | | | | 359/530 |
| 2011/0058389 A1 | 3/2011 | Shiau et al. | | |
| 2012/0236403 A1 | 9/2012 | Sykora et al. | | |

FOREIGN PATENT DOCUMENTS

| | | | | | |
|---|---|---|---|---|---|
| CN | 104614791 B | | 5/2017 | | |
| JP | 2948796 B1 | * | 9/1999 | | |
| JP | 11249137 A | * | 9/1999 | | |
| JP | 2005063926 A | * | 3/2005 | ............. | G02B 5/045 |
| JP | 2006119561 A | * | 5/2006 | ........... | G02B 5/0215 |
| JP | 2006337526 A | * | 12/2006 | | |
| JP | 2007005277 A | * | 1/2007 | | |
| JP | 2009164896 A | * | 7/2009 | | |
| JP | 2010205511 A | * | 9/2010 | | |
| JP | 2010243982 A | | 10/2010 | | |
| TW | M293442 U | | 7/2006 | | |
| TW | M333584 U | | 6/2008 | | |
| TW | 201007292 A | | 2/2010 | | |
| TW | 201109739 A | | 3/2011 | | |

* cited by examiner

OPTICAL PLATE AND DISPLAY APPARATUS

RELATED APPLICATIONS

This application claims priority to Taiwanese Application Serial Number 109127400 filed Aug. 12, 2020, which is herein incorporated by reference.

BACKGROUND

Technical Field

The present disclosure relates to optical plates and display apparatus disposed with these optical plates.

Description of Related Art

With regard to the continuous increase of the living quality of people, the application of electronic products has become an indispensable part of life. Among a wide variety of electronic products, electronic products with function of display have become more and more popular. On the contrary, relative to the rapid development of technology, the demand and expectation of people for electronic products have also been increasing.

As a result, apart from working hard by the manufacturers to decrease the cost of production of electronic products, the way to improve the quality of electronic products while making the appearance of electronic products to become slimmer and thinner is undoubtedly an important direction of development of the industry.

SUMMARY

A technical aspect of the present disclosure is to provide a display apparatus, which can enhance the display effect of the display apparatus, such that the problem of uneven brightness of the display apparatus is solved.

According to an embodiment of the present disclosure, a display apparatus includes a light-transmitting structural plate, a plurality of first optical microscopic structures, an optical film, a base plate and a plurality of light emitting elements. The light-transmitting structural plate has a first side and a second side. The first side and the second side are opposite to each other. The first optical microscopic structures are regularly arrayed and formed on one of the first side and the second side. Each of the first optical microscopic structures has at least one first inclined surface. Each of the first inclined surfaces and the corresponding first inclined surface of an adjacent one of the first optical microscopic structures connect along a first connecting line and form a first angle therebetween. The first angle ranges between 30 degrees and 150 degrees. The optical film is located on the first side. The base plate is separated from the second side by a space. The light emitting elements are located inside the space and disposed on the base plate. The light emitting elements are respectively configured to emit a light ray to the light-transmitting structural plate.

In one or more embodiments of the present disclosure, each of the first optical microscopic structures is a conical protruding structure. The conical protruding structure includes a polygonal base and a peak. The polygonal base is a part of the first side. The corresponding first inclined surface connects between the peak and a perimeter of the polygonal base.

In one or more embodiments of the present disclosure, each of the perimeters has a long edge and two short edges. The short edges and the long edge connect to form an isosceles triangle. The long edge and the corresponding long edge of an adjacent one of the perimeters connect along the first connecting line.

In one or more embodiments of the present disclosure, each of the conical protruding structures further includes two second inclined surfaces. The second inclined surfaces connect with each other and respectively connect between the peak and the corresponding short edge. Each of the second inclined surfaces and the corresponding second inclined surface of an adjacent one of the conical protruding structures connect along a second connecting line and form a second angle therebetween. The second angle ranges between 30 degrees and 150 degrees.

In one or more embodiments of the present disclosure, each of the second connecting lines and an adjacent one of the second connecting lines arrange as a straight line.

In one or more embodiments of the present disclosure, each of the first connecting lines and an adjacent one of the first connecting lines arrange as a straight line.

In one or more embodiments of the present disclosure, each of the first optical microscopic structures is a conical recessed structure. The conical recessed structure has a polygonal perimeter and a base point. The polygonal perimeter defines a polygonal opening. The base point is closer to the light-transmitting structural plate than the polygonal opening to the light-transmitting structural plate. The corresponding first inclined surface connects between the base point and the polygonal perimeter.

In one or more embodiments of the present disclosure, each of the polygonal perimeters has a long edge and two short edges. The short edges and the long edge connect to form an isosceles triangle. The long edge and the corresponding long edge of an adjacent one of the polygonal perimeters connect along the first connecting line.

In one or more embodiments of the present disclosure, each of the conical recessed structures further includes two second inclined surfaces. The second inclined surfaces connect with each other and respectively connect between the base point and the corresponding short edge. Each of the second inclined surfaces and the corresponding second inclined surface of an adjacent one of the conical recessed structures connect along a second connecting line and form a second angle therebetween. The second angle ranges between 30 degrees and 150 degrees.

In one or more embodiments of the present disclosure, each of the second connecting lines and an adjacent one of the second connecting lines arrange as a straight line.

In one or more embodiments of the present disclosure, the display apparatus further includes a plurality of second optical microscopic structures. When the first optical microscopic structures are regularly arrayed and formed on one of the first side and the second side, the second optical microscopic structures are regularly arrayed and formed on another one of the first side and the second side.

In one or more embodiments of the present disclosure, the first optical microscopic structures are the same as the second optical microscopic structures.

In one or more embodiments of the present disclosure, the first optical microscopic structures are different from the second optical microscopic structures.

According to an embodiment of the present disclosure, an optical plate includes a structural plate and a plurality of first optical microscopic structures. The structural plate has a degree of transmittance. The structural has a first side and a second side. The first side and the second side are opposite to each other. The first optical microscopic structures are regularly arrayed and formed on one of the first side and the second side. Each of the first optical microscopic structures has at least one first inclined surface. Each of the first inclined surfaces and the corresponding first inclined surface of an adjacent one of the first optical microscopic structures connect along a first connecting line and form a first angle therebetween. The first angle ranges between 30 degrees and 150 degrees.

In one or more embodiments of the present disclosure, the structural plate and the first optical microscopic structures are of an integrally formed structure.

In one or more embodiments of the present disclosure, the optical plate further includes a plurality of second optical microscopic structures. When the first optical microscopic structures are regularly arrayed and formed on one of the first side and the second side, the second optical microscopic structures are regularly arrayed and formed on another one of the first side and the second side.

In one or more embodiments of the present disclosure, the structural plate and the second optical microscopic structures are of an integrally formed structure.

According to an embodiment of the present disclosure, a display apparatus includes a light-transmitting structural plate, a plurality of optical microscopic structures, an optical film, a base plate and a plurality of light emitting elements. The light-transmitting structural plate has a first side and a second side. The first side and the second side are opposite to each other. The optical microscopic structures are regularly arrayed and formed on one of the first side and the second side. Each of the optical microscopic structures is of a semi-elliptical shape. The optical film is located on the first side. The base plate is separated from the second side by a space. The light emitting elements are located inside the space and disposed on the base plate. The light emitting elements are respectively configured to emit a light ray to the light-transmitting structural plate.

When compared with the prior art, the above-mentioned embodiments of the present disclosure have at least the following advantages:

(1) Through the inclined surfaces of the first optical microscopic structures, the light rays emitted from the light emitting elements to the light-transmitting structural plate are evenly diffused by the first optical microscopic structures, such that a user can see a screen with brightness of a better uniformity through the optical film and other elements of the display apparatus. Thus, the taste of brightness of the display apparatus is enhanced.

(2) Since the first optical microscopic structures can provide the effect of diffusion to the light rays in an even manner, the dimensions of space between the base plate and the light-transmitting structural plate can be effectively reduced, such that the thickness of the display apparatus can also be effectively reduced.

(3) Since the first optical microscopic structures can provide the effect of diffusion to the light rays in an even manner, the intervals between the light emitting elements can be effectively increased, such that the quantity of the light emitting elements to be used can be effectively decreased. Thus, the cost of production for the display apparatus can be effectively decreased.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
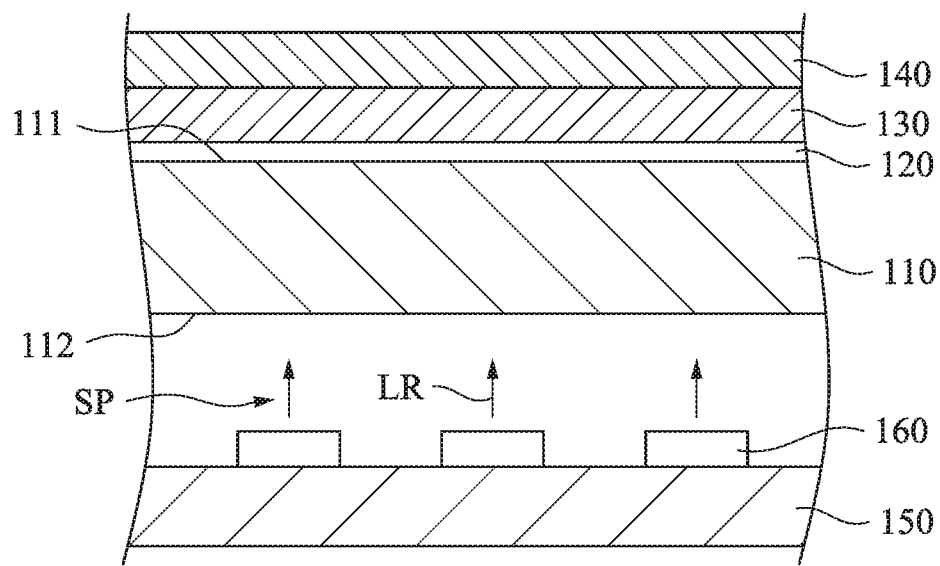
FIG. 1 is a sectional view of a display apparatus according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference is made to FIG. 1. FIG. 1 is a sectional view of a display apparatus 100 according to an embodiment of the present disclosure. In this embodiment, as shown in FIG. 1, a display apparatus 100 includes a light-transmitting structural plate 110, a plurality of first optical microscopic structures 120, an optical film 140, a base plate 150 and a plurality of light emitting elements 160. The light-transmitting structural plate 110 has a degree of transmittance, which means the light-transmitting structural plate 110 can be transparent or has a certain degree of haze. In addition, the light-transmitting structural plate 110 has a first side 111 and a second side 112. The first side 111 and the second side 112 are opposite to each other. The first optical microscopic structures 120 are regularly arrayed and formed on one of the first side 111 and the second side 112 of the light-transmitting structural plate 110. In practice, the light-transmitting structural plate 110 and the first optical microscopic structures 120 are of an integrally formed structure. In other words, the light-transmitting structural plate 110 and the first optical microscopic structures 120 are processed from a single piece of material. For example, as shown in FIG. 1, the first optical microscopic structures 120 are regularly arrayed and formed on the first side 111 of the light-transmitting structural plate 110. Since the size of each of the first optical microscopic structures 120 is very small, for the sake of simplification and easy understanding, the first optical microscopic structures 120 regularly arrayed and formed are presented as a structural layer in FIG. 1, and the details of the first optical microscopic structures 120 regularly arrayed and formed are presented in FIG. 2. Moreover, the optical film 140 is located on the first side 111 of the light-transmitting structural plate 110. The base plate 150 is separated from the second side 112 the light-transmitting structural plate 110 of by a space SP. The light emitting elements 160 are located inside the space SP and disposed on the base plate 150. The light emitting elements 160 are respectively configured to emit a light ray LR to the light-transmitting structural plate 110. After the light rays LR penetrate through the light-transmitting structural plate 110 and the first optical microscopic structures 120, the light rays LR then penetrate through the optical film 140 and are emitted from the optical film 140. In addition, when the light rays LR are not white in color, the display apparatus 100 further includes a color conversion layer 130. As shown in FIG. 1, the color conversion layer 130 is located between the optical film 140 and the light-transmitting structural plate 110. The color conversion layer 130 is configured to convert the color of the light rays LR. In other embodiments, when the light rays LR are white in color, the color conversion layer 130 can be omitted.

Figure 2:
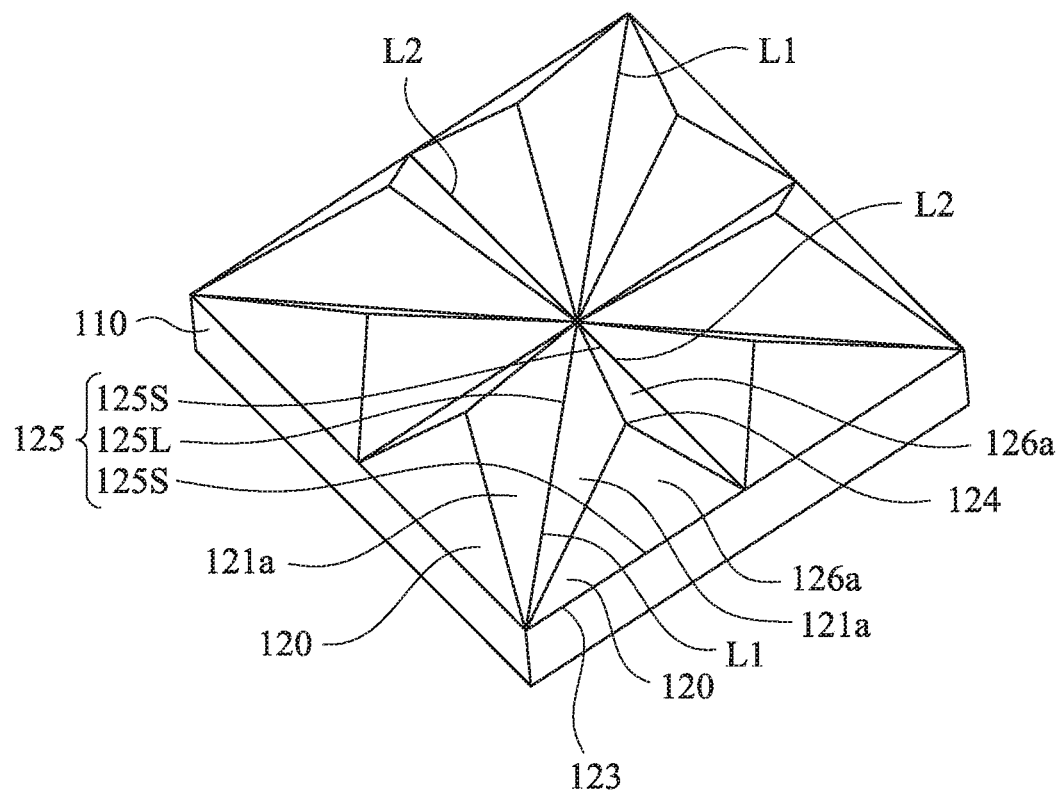
FIG. 2 is a schematic view of the first optical microscopic structures and the light-transmitting structural plate of FIG. 1.
Figure 3:
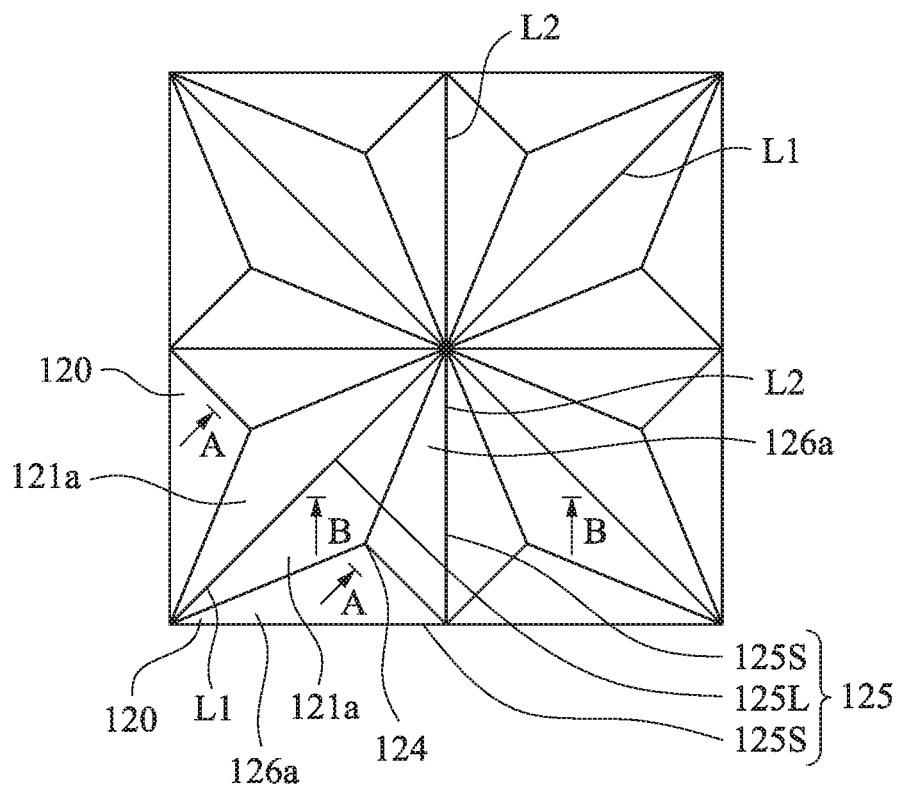
FIG. 3 is a top view of the first optical microscopic structures of FIG. 2.

Reference is made to FIGS. 2-3. FIG. 2 is a schematic view of the first optical microscopic structures 120 and the light-transmitting structural plate 110 of FIG. 1. FIG. 3 is a top view of the first optical microscopic structures 120 of FIG. 2. In this embodiment, as shown in FIGS. 2-3, each of the first optical microscopic structures 120 has at least one first inclined surface 121a. Each of the first inclined surfaces 121a is configured to allow the light ray LR (please refer to FIG. 1) to penetrate through. Through the inclined angle of each of the first inclined surfaces 121a, the effect of diffusion is produced to the light ray LR. Each of the first inclined surfaces 121a and the corresponding first inclined surface 121a of an adjacent one of the first optical microscopic structures 120 connect along a first connecting line L1.

To be more specific, in this embodiment, as shown in FIGS. 2-3, each of the first optical microscopic structures 120 is a conical protruding structure. The first optical microscopic structure 120 as a conical protruding structure includes a polygonal base 123 and a peak 124. The polygonal base 123 is a part of the first side 111 of the light-transmitting structural plate 110. The corresponding first inclined surface 121a connects between the peak 124 and a perimeter 125 of the polygonal base 123.

Furthermore, the perimeter 125 of each of the polygonal bases 123 has a long edge 125L and two short edges 125S. In this embodiment, the short edges 125S and the long edge 125L connect to form an isosceles triangle, as shown in FIG. 3. The long edge 125L and the corresponding long edge 125L of an adjacent one of the perimeters 125 connect along the first connecting line L1.

Figure 4:
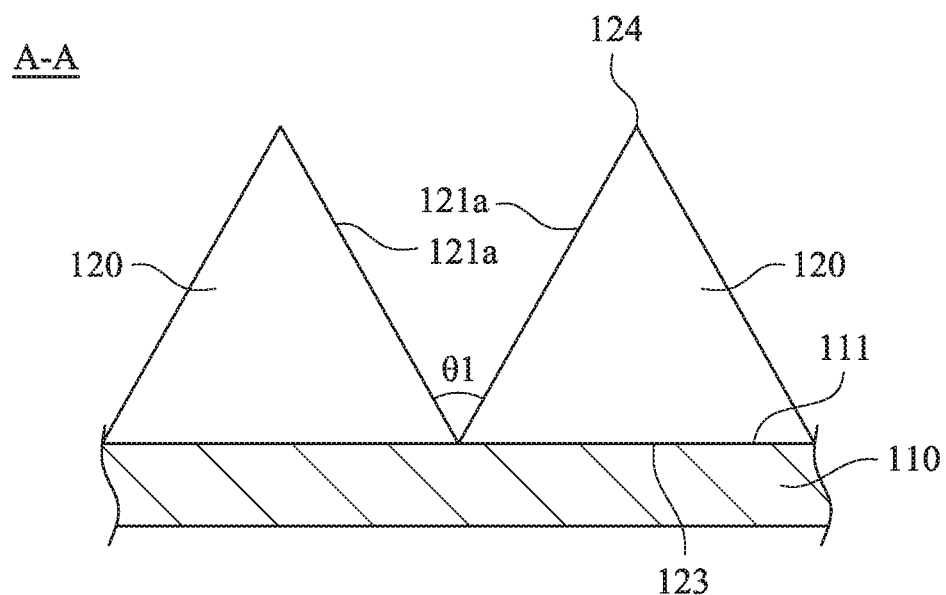
FIG. 4 is a sectional view along a section line A-A of FIG. 3.

Reference is made to FIG. 4. FIG. 4 is a sectional view along a section line A-A of FIG. 3. In this embodiment, as shown in FIG. 4, each of the first inclined surfaces 121a and the corresponding first inclined surface 121a of an adjacent one of the first optical microscopic structures 120 form a first angle θ1 therebetween. In practical applications, the first angle 81 ranges between 30 degrees and 150 degrees. However, this does not intend to limit the present disclosure.

Moreover, as shown in FIGS. 2-3, the first optical microscopic structure 120 as a conical protruding structure further includes two second inclined surfaces 126a. Similarly, each of the second inclined surfaces 126a is configured to allow the light ray LR (please refer to FIG. 1) to penetrate through. Through the inclined angle of each of the second inclined surfaces 126a, the effect of diffusion is produced to the light ray LR. To be specific, the second inclined surfaces 126a connect with each other and respectively connect between the peak 124 and the corresponding short edge 125S. Each of the second inclined surfaces 126a and the corresponding second inclined surface 126a of an adjacent one of the conical protruding structures (which are the first optical microscopic structures 120) connect along a second connecting line L2.

Figure 5:
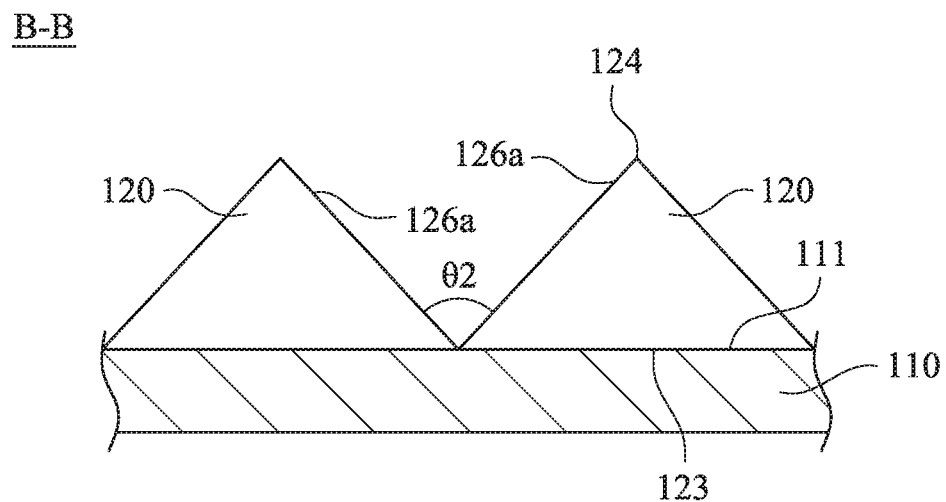
FIG. 5 is a sectional view along a section line B-B of FIG. 3.

Reference is made to FIG. 5. FIG. 5 is a sectional view along a section line B-B of FIG. 3. In this embodiment, as shown in FIG. 5, each of the second inclined surfaces 126a and the corresponding second inclined surface 126a of an adjacent one of the conical protruding structures (which are the first optical microscopic structures 120) form a second angle θ2 therebetween. In practical applications, the second angle θ2 ranges between 30 degrees and 150 degrees. However, this does not intend to limit the present disclosure.

It is worth to note that, as shown in FIGS. 2-3, due to the pattern that the first optical microscopic structures 120 are regularly arrayed and formed, each of the second connecting lines L2 and an adjacent one of the second connecting lines L2 arrange as a straight line, and each of the first connecting lines L1 and an adjacent one of the first connecting lines L1 also arrange as a straight line.

Through the inclined surfaces of the first optical microscopic structures 120, which are the first inclined surfaces 121a and the second inclined surfaces 126a as mentioned above, the light rays LR (please refer to FIG. 1) emitted from the light emitting elements 160 to the light-transmitting structural plate 110 will be evenly diffused by the first optical microscopic structures 120, such that a user can see a screen with brightness of a better uniformity through the optical film 140 and other elements (not shown) of the display apparatus 100. Thus, the taste of brightness of the display apparatus 100 is enhanced. Furthermore, since the first optical microscopic structures 120 can provide the effect of diffusion to the light rays LR in an even manner, the dimensions of space SP between the base plate 150 and the light-transmitting structural plate 110 can be effectively reduced, such that the thickness of the display apparatus 100 can also be effectively reduced. Moreover, since the first optical microscopic structures 120 can provide the effect of diffusion to the light rays LR in an even manner, the intervals between the light emitting elements 160 can be effectively increased, such that the quantity of the light emitting elements 160 to be used can be effectively decreased. Thus, the cost of production for the display apparatus 100 can be effectively decreased.

Figure 6:
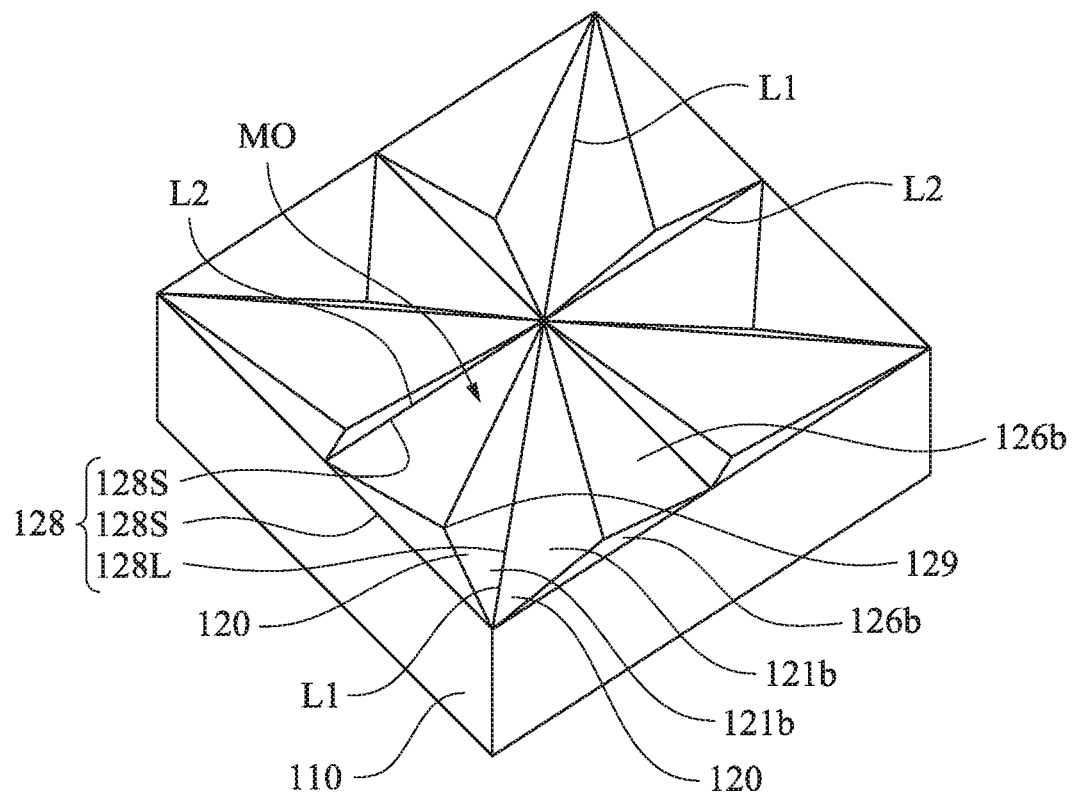
FIG. 6 is a schematic view of a plurality of first optical microscopic structures according to another embodiment of the present disclosure.
Figure 7:
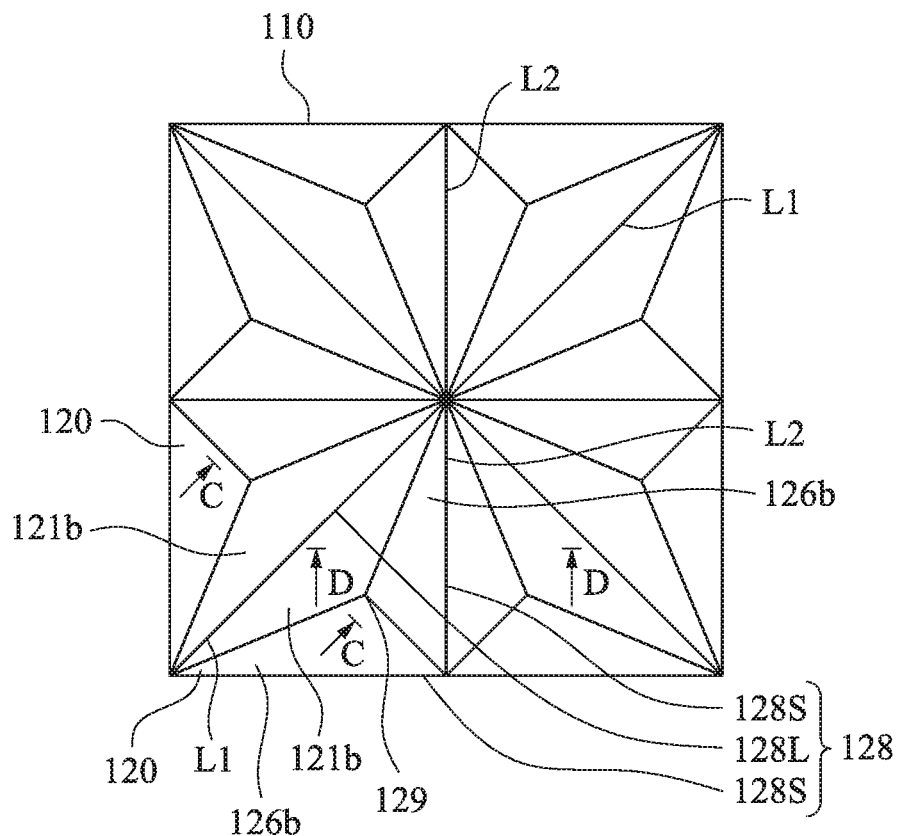
FIG. 7 is a top view of the first optical microscopic structures of FIG. 6.

Reference is made to FIGS. 6-7. FIG. 6 is a schematic view of a plurality of first optical microscopic structures 120 according to another embodiment of the present disclosure. FIG. 7 is a top view of the first optical microscopic structures 120 of FIG. 6. In this embodiment, as shown in FIGS. 6-7, each of the first optical microscopic structures 120 is a conical recessed structure formed under the surface of the light-transmitting structural plate 110. The first optical microscopic structure 120 as a conical recessed structure includes a first inclined surface 121b, a polygonal perimeter 128 and a base point 129. The polygonal perimeter 128 defines a polygonal opening MO. The base point 129 is deep into the light-transmitting structural plate 110. The corresponding first inclined surface 121b connects between the base point 129 and the polygonal perimeter 128.

In addition, each of the polygonal perimeters 128 has a long edge 128L and two short edges 128S. In this embodiment, the short edges 128S and the long edge 128L connect to form an isosceles triangle, as shown in FIG. 7. The long edge 128L and the corresponding long edge 128L of an adjacent one of the polygonal perimeters 128 connect along the first connecting line L1.

Figure 8:
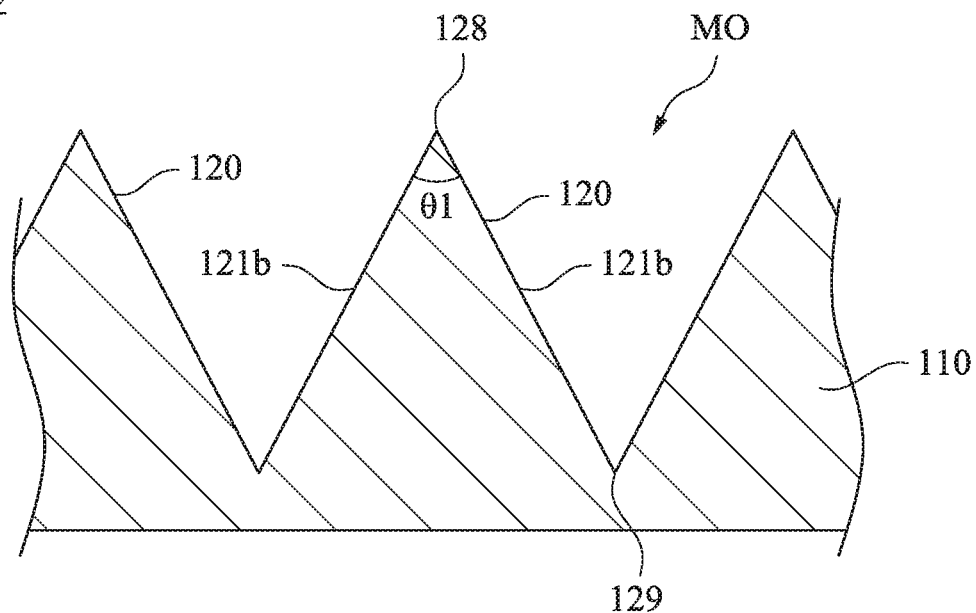
FIG. 8 is a sectional view along a section line C-C of FIG. 7.

Reference is made to FIG. 8. FIG. 8 is a sectional view along a section line C-C of FIG. 7. In this embodiment, as shown in FIG. 8, the base point 129 is deep into the light-transmitting structural plate 110, and each of the first inclined surfaces 121b and the corresponding first inclined surface 121b of an adjacent one of the first optical microscopic structures 120 form a first angle θ1 therebetween. In practical applications, the first angle θ1 ranges between 30 degrees and 150 degrees. However, this does not intend to limit the present disclosure.

Moreover, as shown in FIGS. 6-7, the first optical microscopic structure 120 as a conical recessed structure further includes two second inclined surfaces 126b. Similarly, each of the second inclined surfaces 126b is configured to allow the light ray LR (please refer to FIG. 1) to penetrate through. Through the inclined angle of each of the second inclined surfaces 126b, the effect of diffusion is produced to the light ray LR. To be specific, the second inclined surfaces 126b connect with each other and respectively connect between the base point 129 and the corresponding short edge 128S. Each of the second inclined surfaces 126b and the corresponding second inclined surface 126b of an adjacent one of the conical recessed structures (which are the first optical microscopic structures 120) connect along a second connecting line L2.

Figure 9:
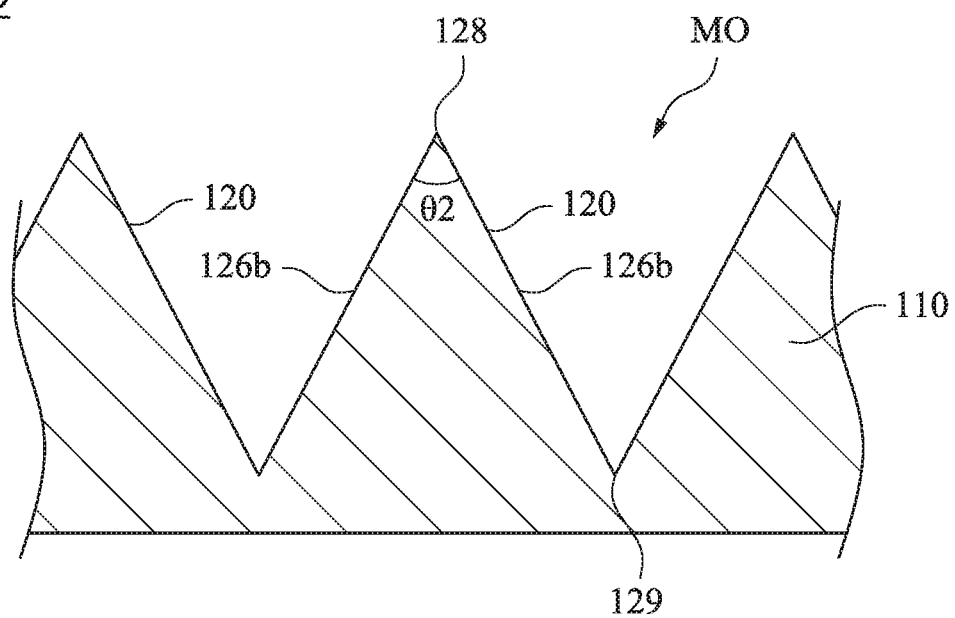
FIG. 9 is a sectional view along a section line D-D of FIG. 7.

Reference is made to FIG. 9. FIG. 9 is a sectional view along a section line D-D of FIG. 7. In this embodiment, as shown in FIG. 9, the base point 129 is deep into the light-transmitting structural plate 110, and each of the second inclined surfaces 126b and the corresponding second inclined surface 126b of an adjacent one of the conical recessed structures (which are the first optical microscopic structures 120) form a second angle θ2 therebetween. In practical applications, the second angle θ2 ranges between 30 degrees and 150 degrees. However, this does not intend to limit the present disclosure.

It is worth to note that, as shown in FIGS. 6-7, due to the pattern that the first optical microscopic structures 120 are regularly arrayed and formed, each of the second connecting lines L2 and an adjacent one of the second connecting lines L2 arrange as a straight line, and each of the first connecting lines L1 and an adjacent one of the first connecting lines L1 also arrange as a straight line.

Figure 10:
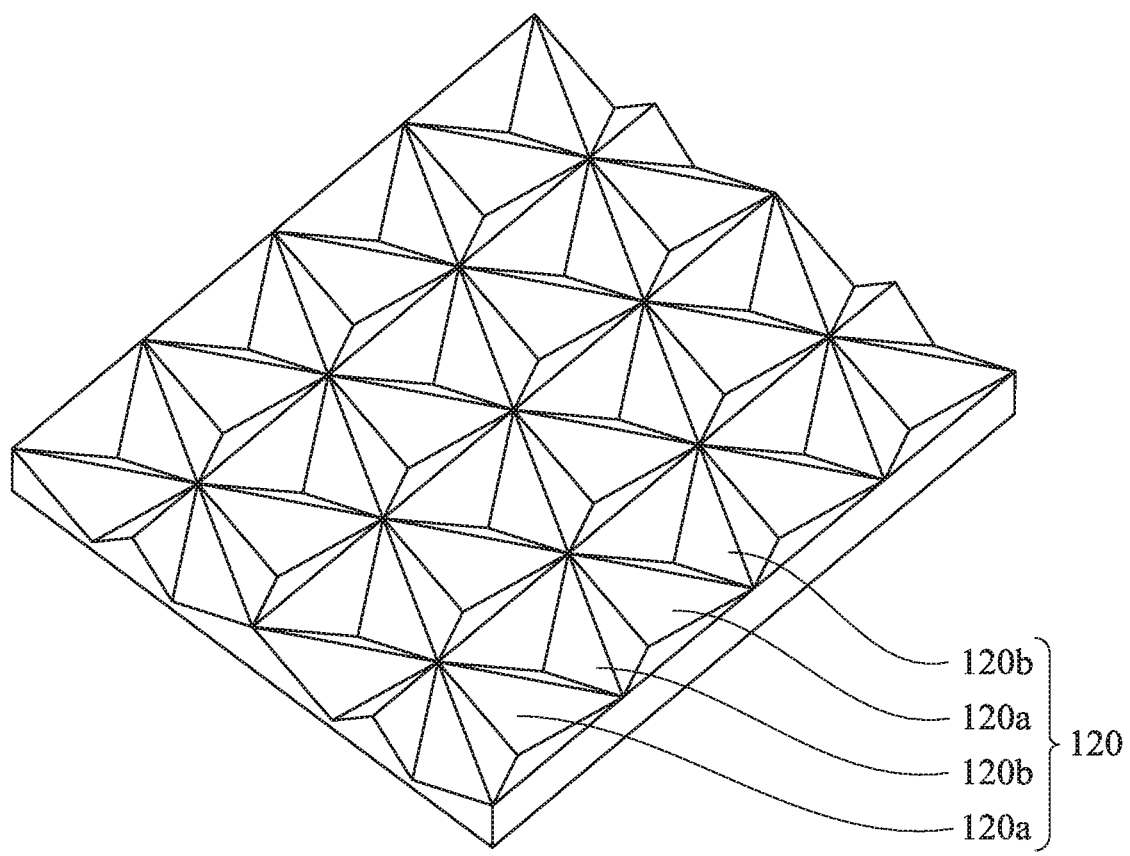
FIG. 10 is a schematic view of a plurality of first optical microscopic structures according to a further embodiment of the present disclosure.

Reference is made to FIG. 10. FIG. 10 is a schematic view of a plurality of first optical microscopic structures 120 according to a further embodiment of the present disclosure. In this embodiment, according to the actual situation, some of the first optical microscopic structures 120 are conical protruding structures 120a, while some other of the first optical microscopic structures 120 are conical recessed structures 120b. For example, as shown in FIG. 10, the conical protruding structures 120a and the conical recessed structures 120b are regularly arranged in a staggered manner. However, this does not intend to limit the present disclosure.

Figure 11:
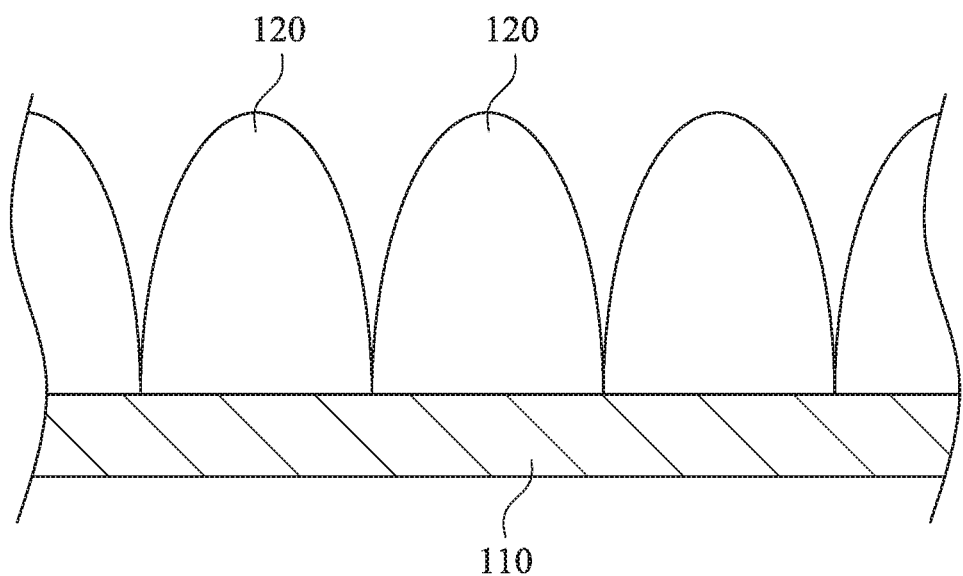
FIG. 11 is a side view of a plurality of first optical microscopic structures according to another embodiment of the present disclosure.

Reference is made to FIG. 11. FIG. 11 is a side view of a plurality of first optical microscopic structures 120 according to another embodiment of the present disclosure. In this embodiment, as shown in FIG. 11, each of the first optical microscopic structures 120 is of a semi-elliptical shape. The first optical microscopic structures 120 of the semi-elliptical shapes are regularly arrayed and formed on the light-transmitting structural plate 110.

Figure 12:
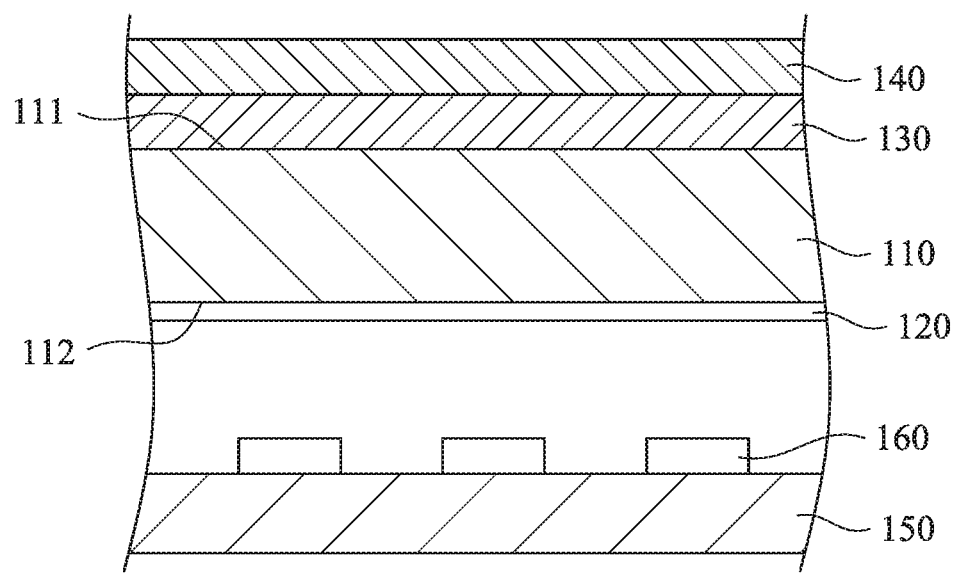
FIG. 12 is a sectional view of a display apparatus according to a further embodiment of the present disclosure.

Reference is made to FIG. 12. FIG. 12 is a sectional view of a display apparatus 100 according to a further embodiment of the present disclosure. According to the actual situation, as shown in FIG. 12, the first optical microscopic structures 120 are regularly arrayed and formed on the second side 112 of the light-transmitting structural plate 110, but not regularly arrayed and formed on the first side 111 of the light-transmitting structural plate 110.

Figure 13:
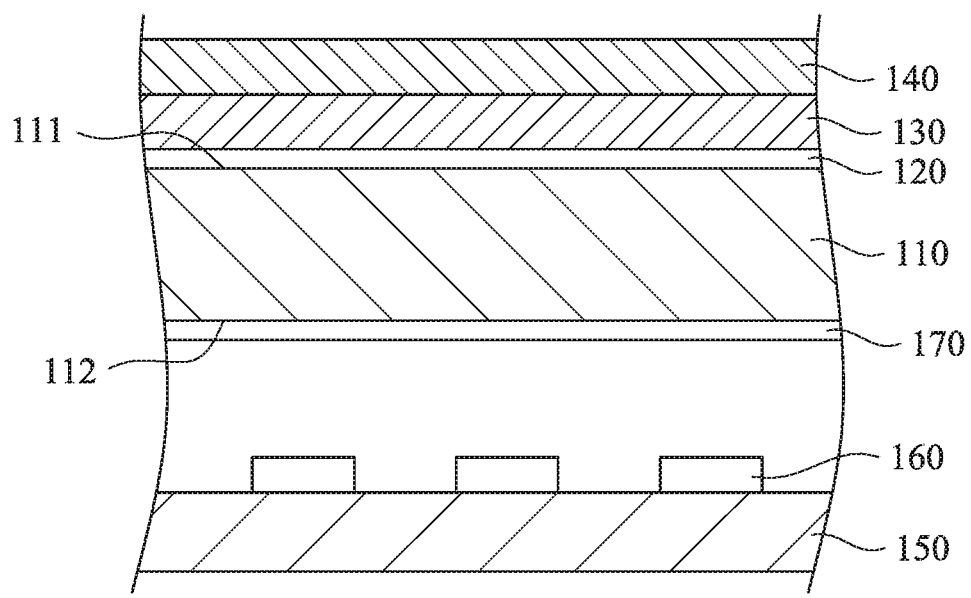
FIG. 13 is a sectional view of a display apparatus according to another embodiment of the present disclosure.

Reference is made to FIG. 13. FIG. 13 is a sectional view of a display apparatus 100 according to another embodiment of the present disclosure. According to the actual situation, the display apparatus 100 further includes a plurality of second optical microscopic structures 170. To be specific, when the first optical microscopic structures 120 are regularly arrayed and formed on one of the first side 111 and the second side 112 of the light-transmitting structural plate 110, the second optical microscopic structures 170 are regularly arrayed and formed on another one of the first side 111 and the second side 112 of the light-transmitting structural plate 110. As mentioned above, the light-transmitting structural plate 110 and the first optical microscopic structures 120 are of an integrally formed structure. Moreover, the light-transmitting structural plate 110 and the second optical microscopic structures 170 are also of an integrally formed structure. Thus, the light-transmitting structural plate 110, the first optical microscopic structures 120 and the second optical microscopic structures 170 are practically processed from a single piece of material. In this embodiment, as shown in FIG. 13, the first optical microscopic structures 120 are regularly arrayed and formed on the first side 111 of the light-transmitting structural plate 110, and the second optical microscopic structures 170 are regularly arrayed and formed on the second side 112 of the light-transmitting structural plate 110.

In practical applications, the first optical microscopic structures 120 can be the same as the second optical microscopic structures 170. For example, when the first optical microscopic structures 120 are conical protruding structures as mentioned above, the second optical microscopic structures 170 are also conical protruding structures. When the first optical microscopic structures 120 are conical recessed structures as mentioned above, the second optical microscopic structures 170 are also conical recessed structures. When the first optical microscopic structures 120 are of semi-elliptical shapes as mentioned above, the second optical microscopic structures 170 are also of semi-elliptical shapes. However, according to the actual situation, the first optical microscopic structures 120 can also be different from the second optical microscopic structures 170. For example, when the first optical microscopic structures 120 are conical protruding structures as mentioned above, the second optical microscopic structures 170 are conical recessed structures instead. When the first optical microscopic structures 120 are conical recessed structures as mentioned above, the second optical microscopic structures 170 are conical protruding structures instead.

Figure 14:
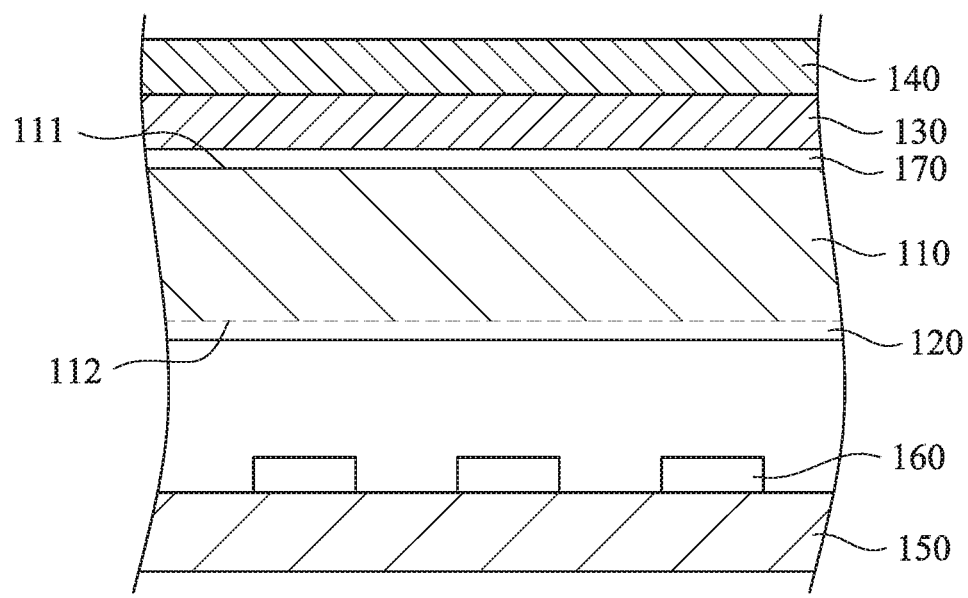
FIG. 14 is a sectional view of a display apparatus according to a further embodiment of the present disclosure.

Reference is made to FIG. 14. FIG. 14 is a sectional view of a display apparatus 100 according to a further embodiment of the present disclosure. In this embodiment, as shown in FIG. 14, the first optical microscopic structures 120 are regularly arrayed and formed on the second side 112 of the light-transmitting structural plate 110, and the second optical microscopic structures 170 are regularly arrayed and formed on the first side 111 of the light-transmitting structural plate 110. Similarly, according to the actual situation, the first optical microscopic structures 120 and the second optical microscopic structures 170 can be the same or can be different. For example, as shown in FIG. 14, the first optical microscopic structures 120 are conical recessed structures, and the second optical microscopic structures 170 are conical protruding structures.

In conclusion, when compared with the prior art, the aforementioned embodiments of the present disclosure have at least the following advantages:

(1) Through the inclined surfaces of the first optical microscopic structures, the light rays emitted from the light emitting elements to the light-transmitting structural plate are evenly diffused by the first optical microscopic structures, such that a user can see a screen with brightness of a better uniformity through the optical film and other elements of the display apparatus. Thus, the taste of brightness of the display apparatus is enhanced.

(2) Since the first optical microscopic structures can provide the effect of diffusion to the light rays in an even manner, the dimensions of space between the base plate and the light-transmitting structural plate can be effectively reduced, such that the thickness of the display apparatus can also be effectively reduced.

(3) Since the first optical microscopic structures can provide the effect of diffusion to the light rays in an even manner, the intervals between the light emitting elements can be effectively increased, such that the quantity of the light emitting elements to be used can be effectively decreased. Thus, the cost of production for the display apparatus can be effectively decreased.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A display apparatus, comprising:
a light-transmitting structural plate having a first side and a second side opposite to each other;
eight first optical microscopic structures regularly arrayed around an intersection point, and formed on one of the first side and the second side, each of the eight first optical microscopic structures having a first inclined surface and two second inclined surfaces connected with the first inclined surface to form a pyramid with an isosceles triangular base located on the light-transmitting structural plate, each of the eight isosceles triangular bases having a long edge and two short edges, an edge of each of the eight first inclined surfaces away from a tip of a corresponding one of the eight pyramids defining one of the eight long edges, the long edge of each of the eight first inclined surfaces and the long edge of the first inclined surface of an adjacent one of the eight first optical microscopic structures connecting with each other at a first connecting line, two of the eight first inclined surfaces connected with each other at one of the first connecting lines forming a first angle therebetween, each of the first angles ranging between 30 degrees and 150 degrees, an edge of each of the sixteen second inclined surfaces away from the tip of a corresponding one of the eight pyramids defining one of the sixteen short edges, the short edge of each of the sixteen second inclined surfaces and the short edge of a corresponding one of the two second inclined surfaces of an adjacent one of the eight first optical microscopic structures connecting with each other at a second connecting line, each of the second connecting lines and an adjacent one of the second connecting lines connecting with each other as a first straight line at the intersection point, a corresponding one of the first connecting lines and an adjacent one of the first connecting lines connecting with each other as a second straight line at the intersection point;
an optical film located on the first side;
a base plate separating from the second side by a space; and
a plurality of light emitting elements located inside the space and disposed on the base plate, the light emitting elements being respectively configured to emit a light ray to the light-transmitting structural plate.

2. The display apparatus of claim 1, wherein each of the first optical microscopic structures is a protruding pyramid, the isosceles triangular base is a part of the first side.

3. The display apparatus of claim 2, wherein two of the second inclined surfaces connected with each other at one of the second connecting lines form a second angle therebetween, each of the second angles ranges between 30 degrees and 150 degrees.

4. The display apparatus of claim 1, wherein each of the first optical microscopic structures is a recessed pyramid, each of the isosceles triangular bases defines a triangular opening, the tip of each of the recessed pyramids is closer to the light-transmitting structural plate than a corresponding one of the triangular openings to the light-transmitting structural plate.

5. The display apparatus of claim 4, wherein two of the second inclined surfaces connected with each other at one of the second connecting lines form a second angle therebetween, each of the second angles ranges between 30 degrees and 150 degrees.

6. The display apparatus of claim 1, further comprising a plurality of second optical microscopic structures, wherein when the first optical microscopic structures are regularly arrayed and formed on one of the first side and the second side, the second optical microscopic structures are regularly arrayed and formed on another one of the first side and the second side.

7. The display apparatus of claim 6, wherein the first optical microscopic structures are the same as the second optical microscopic structures.

8. The display apparatus of claim 6, wherein the first optical microscopic structures are different from the second optical microscopic structures.

9. An optical plate, comprising:
a structural plate having a degree of transmittance, the structural plate having a first side and a second side opposite to each other; and
eight first optical microscopic structures regularly arrayed around an intersection point and formed on one of the first side and the second side, each of the eight first optical microscopic structures having a first inclined surface and two second inclined surfaces connected with the first inclined surface to form a pyramid with an isosceles triangular base located on the structural plate, each of the eight isosceles triangular bases having a long edge and two short edges, an edge of each of the eight first inclined surfaces away from a tip of a corresponding one of the eight pyramids defining one of the eight long edges, the long edge of each of the eight first inclined surfaces and the long edge of the first inclined surface of an adjacent one of the eight first optical microscopic structures connecting with each other at a first connecting line, two of the eight first inclined surfaces connected with each other at one of the first connecting lines forming an angle therebetween, each of the angles ranging between 30 degrees and 150 degrees, an edge of each of the sixteen second inclined surfaces away from the tip of a corresponding one of the eight pyramids defining one of the sixteen short edges, the short edge of each of the sixteen second inclined surfaces and the short edge of a corresponding one of the two second inclined surfaces of an adjacent one of the eight first optical microscopic structures connecting with each other at a second connecting line, each of the second connecting lines and an adjacent one of the second connecting lines connecting with each other as a first straight line at the intersection point, a corresponding one of the first connecting lines and an adjacent one of the first connecting lines connecting with each other as a second straight line at the intersection point.

10. The optical plate of claim 9, wherein the structural plate and the first optical microscopic structures are of an integrally formed structure.

11. The optical plate of claim 9, further comprising a plurality of second optical microscopic structures, wherein when the first optical microscopic structures are regularly arrayed and formed on one of the first side and the second side, the second optical microscopic structures are regularly arrayed and formed on another one of the first side and the second side.

12. The optical plate of claim 11, wherein the structural plate and the second optical microscopic structures are of an integrally formed structure.

* * * * *